(12) United States Patent
Kamo et al.

(10) Patent No.: US 8,124,694 B2
(45) Date of Patent: Feb. 28, 2012

(54) MOLD RELEASING FILM FOR PRINTED CIRCUIT BOARD PRODUCTION

(75) Inventors: Hiroshi Kamo, Chiba (JP); Yuuji Kusumi, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 272 days.

(21) Appl. No.: 12/458,837

(22) Filed: Jul. 23, 2009

(65) Prior Publication Data

US 2009/0292082 A1 Nov. 26, 2009

Related U.S. Application Data

(63) Continuation of application No. 10/550,063, filed as application No. PCT/JP2004/005380 on Apr. 15, 2004, now Pat. No. 7,851,271.

(30) Foreign Application Priority Data

Apr. 18, 2003 (JP) .............................. P.2003-113843

(51) Int. Cl.
*C08L 71/12* (2006.01)
(52) U.S. Cl. .......... 525/397; 524/19; 524/432; 524/433; 524/436; 524/611
(58) Field of Classification Search .......................... None
See application file for complete search history.

(56) References Cited

U.S. PATENT DOCUMENTS

| | | | |
|---|---|---|---|
| 4,433,083 A | 2/1984 | Cogswell et al. | |
| 4,777,201 A | 10/1988 | Shigemoto et al. | |
| 4,910,082 A * | 3/1990 | Kohn .......................... | 428/333 |
| 7,851,271 B2 * | 12/2010 | Kamo et al. .................. | 438/127 |
| 2004/0214006 A1 | 10/2004 | Hirayama et al. | |
| 2005/0016764 A1 | 1/2005 | Echigo et al. | |

FOREIGN PATENT DOCUMENTS

| | | |
|---|---|---|
| EP | 0 480 677 | 4/1992 |
| EP | 0 480 766 | 4/1992 |
| JP | 3-126538 | 5/1991 |
| JP | 6-316032 | 11/1994 |
| JP | 2790330 | 6/1998 |
| JP | 11-349703 | 12/1999 |
| JP | 2000-38461 | 2/2000 |
| JP | 2000-263724 | 9/2000 |
| JP | 2000-272055 | 10/2000 |
| JP | 2001-233968 | 8/2001 |
| JP | 2001-246635 | 9/2001 |
| JP | 2001-310422 | 11/2001 |
| JP | 2001-335646 | 12/2001 |
| JP | 2002-241515 | 8/2002 |
| JP | 2002-241601 | 8/2002 |
| JP | 2002-248714 | 9/2002 |
| JP | 2003-1772 | 1/2003 |
| JP | 2003-12829 | 1/2003 |
| JP | 2003-53896 | 2/2003 |
| JP | 2003-82244 | 3/2003 |
| JP | 2003-82245 | 3/2003 |
| JP | 62-13450 | 8/2003 |
| JP | 2003-231806 | 8/2003 |
| JP | 2003-236870 | 8/2003 |
| JP | 2003-246019 | 9/2003 |
| JP | 2003-276139 | 9/2003 |
| JP | 2003-313313 | 11/2003 |
| JP | 2004-51688 | 2/2004 |
| WO | WO 00/40655 | 7/2000 |

OTHER PUBLICATIONS

U.S. Appl. No. 10/550,063, filed Sep. 21, 2005, Hiroshi Kamo, Asahi Kasei Chemicals Corporation.
Supplementary European Search Report, mailed Feb. 21, 2008 and issued in corresponding European Patent Application No. 04727714.0-1214.
Office Action issued Dec. 4, 2008 in corresponding European Patent Application No. 04 727 714.0. (in English).
Office Action issued Feb. 9, 2009 in U.S. Appl. No. 10/550,063.
Office Action issued Aug. 25, 2008 in U.S. Appl. No. 10/550,063.
Office Action issued Feb. 11, 2008 in U.S. Appl. No. 10/550,063.
Office Action issued Jul. 24, 2007 in U.S. Appl. No. 10/550,063.
Notice of Allowance for U.S. Appl. No. 10/550,063, mailed on Aug. 2, 2010.
U.S. Office Action mailed Oct. 16, 2009 in related U.S. Appl. No. 10/550,063.

* cited by examiner

*Primary Examiner* — Marc Zimmer
(74) *Attorney, Agent, or Firm* — Staas & Halsey LLP

(57) ABSTRACT

The present invention relates to a mold releasing film for printed circuit board production, which comprises a resin layer (P) containing (A) a polyphenylene ether-based resin in an amount of 50 wt % or more. According to the present invention, it is possible to provide a mold releasing film suitable for production of printed circuit boards, particularly flexible printed circuit boards, which is excellent in mold-releasing property, exhibits little heat shrinkage, hardly imparts wrinkles to printed circuit board products, itself hardly gets wrinkled, and is excellent in contamination resistance since no bleeding-out is observed, and which is also excellent in an anti-moisture absorbing property, shape-following property, less overflow of adhesive, adhesion between multilayer films and slipping property between films.

4 Claims, No Drawings

MOLD RELEASING FILM FOR PRINTED CIRCUIT BOARD PRODUCTION

CROSS REFERENCE TO RELATED APPLICATIONS

This application is a continuation of U.S. patent application Ser. No. 10/550,063, filed Sep. 21, 2005 now U.S. Pat. No. 7,851,271, and is based on and hereby claims priority to PCT Application No. PCT/JP2004/005380 filed on Apr. 15, 2004 and Japanese Application No. 2003-113843 filed on Apr. 18, 2003, the contents of which are hereby incorporated by reference.

TECHNICAL FIELD

The present invention relates to a mold releasing film suitable for production of printed circuit boards, particularly flexible printed circuit boards, which is excellent in mold-releasing property, exhibits little heat shrinkage, hardly imparts wrinkles to printed circuit board products, and itself hardly gets wrinkled and also which is excellent in contamination resistance since no bleeding-out is observed, and is excellent in an anti-moisture absorbing property.

BACKGROUND ART

In the production step of printed circuit boards, flexible printed circuit boards, multilayer printed circuit boards, and the like, a mold releasing film is used at the time when a copper-clad laminate or a copper foil is hot-pressed through a prepreg or a heat-resistant film. Moreover, in the production step of flexible printed circuit boards, a method of inserting a mold releasing film is widely performed for the purpose of preventing adhesion of a cover-lay film to a pressing hot plate at the time when the cover-lay film is subjected to hot press bonding using a thermosetting adhesive to a flexible printed circuit board main body where electric circuits are formed, or for the purpose of preventing adhesion of printed circuit boards to each other or protecting the printed circuit board products at the time when a plurality of monolayer or multilayer printed circuit boards are produced simultaneously.

Recently, in view of increasing social requests for environmental problems and safety, an anti-moisture absorbing property, rigidity and contamination resistance have been required for the mold releasing films in addition to the functions such as heat resistance for enduring hot pressing and mold-releasing property from printed circuit boards (inclusive of PI, epoxy resins, epoxy adhesives, copper foil, etc.) and hot pressing plates. The absorption of moisture may cause blisters by generation of water vapor during the hot pressing. When rigidity is low, the film tends to be wrinkled and suffers from a problem of poor workability. With regard to the contamination resistance, if organic or inorganic components bled out of the mold releasing film are transferred to the surface of the printed circuit board, plating in a subsequent step does not proceed satisfactorily, a washing step is required, or sometimes, a significant problem arises in view of product safety for such products, which should not contain impurities, such as hard disk drives.

However, polymethylpentene films, silicone-coated polyester films, fluorine-based films, and the like which are hitherto used as mold releasing films do not sufficiently satisfy the above performances required for a mold releasing film. Namely, when polymethylpentene films are hot pressed and cooled, a printed circuit board may be sometimes wrinkled by thermal shrinkage. Or, some measure such as a change of the shape of the printed circuit board product must be made so as to avoid wrinkling and hence the freedom of the shape and design is sometimes restricted. Furthermore, in view of the presence of slight transferred matter onto the printed circuit board, application of the printed circuit board product is sometimes restricted and thus the film cannot be considered as being sufficient. The silicone-coated polyester films have an insufficient heat resistance and also there exists a possibility that the quality of products such as printed circuit boards may be impaired by migration of silicone. The fluorine-based films are excellent in heat resistance and mold releasing property but are expensive and have a problem of poor workability owing to low rigidity. Although a crosslinked resin-type mold releasing film is proposed, its rigidity and anti-moisture absorbing property are not sufficient and it involves a problem that a complex process, i.e., a crosslinking step is required. See Patent Documents 1 to 4.

Patent Document 1: U.S. Pat. No. 4,777,201
Patent Document 2: Japanese Patent No. 2790330
Patent Document 3: JP 2003-053896 A
Patent Document 4: JP 2003-012829 A Moreover, a film mainly containing syndiotactic polystyrene has been proposed as a mold releasing film but the wrinkling problem is not sufficiently solved (see Patent Documents 5 to 7).

Patent Document 5: JP 11-349703 A
Patent Document 6: JP 2000-038461 A
Patent Document 7: JP 2001-246635 A Furthermore, an alicyclic polyolefin film has been proposed as a mold releasing film but, from the viewpoint of workability (rigidity) and cost, it is not satisfactory (see Patent Document 8).

Patent Document 8: JP 2001-233968 A

In addition, a film comprising a polyamide resin has been proposed as a mold releasing film but, from the viewpoint of the mold releasing property with an adhesive, it is not satisfactory (see Patent Document 9).

Patent Document 9: JP 6-316032 A

Moreover, a polyether aromatic ketone resin film has been proposed as a mold releasing film but it is not satisfactory since the resin is still a crystalline resin and hence requires a step of heat treatment for covering the problem of thermal shrinkage and from the viewpoint of cost (see Patent Document 10).

Patent Document 10: JP 2003-236870 A

As above, in the conventional technologies, there has been no monolayer releasing film for printed circuit board production that substantially contains PPE as a main component. Since most conventional mold releasing films are constituted by crystalline resins, the temperature for curing an adhesive (mainly from about 130 to 180° C.) exists in the range between their melting point and their glass transition temperature in many cases. Therefore, in the heating and cooling steps of hot pressing, it is difficult to avoid the wrinkle problem of the mold releasing films themselves and of printed circuit board products caused by thermal shrinkage of the mold releasing films.

On the other hand, in addition to the function of the mold releasing property against base films of flexible printed circuit boards represented by polyimide or hot pressing plates, a shape-following property, less overflow of adhesive, adhesion between multilayer films, and slipping property between films are required. The shape-following property means a cushion property of following differences in levels of the polyimide film and copper foil to be adhered thereto and mitigating the impact upon application of pressure during hot pressing. The overflow of an adhesive means the extent of overflow of the adhesive onto an electrode part at a hole where the copper foil is exposed, which is called land, in a circuit placed between base films such as polyimide or cover-lay films. A smaller amount is better. This is because greater overflow may sometimes result in connection failure when connection of a circuit to the electrode is attempted by soldering or the like. Moreover, the reasons why adhesion between multilayer films is required are as follows: A wrinkle problem arises in products, lamination of a third resin layer is needed for adhesion between a surface-layer resin and an intermediate-layer resin and thus the whole film becomes thick, and the structure of a laminate film and a film producing step become complicated. The generation of wrinkles in products may be attributed to generation of an air layer between the layers when the adhesion between the surface-layer resin and the intermediate-layer resin is weak. The reason why the slipping property is required between the films is that, when the slipping property is poor, the films may stick to each other, which causes a decrease of working efficiency.

Although mold releasing films exhibiting a high shape-following property which comprises a multilayer film containing an intervening resin having a low heat resistance as an intermediate layer have been proposed, the conventional technologies cited below are not satisfactory in view of achieving high levels of the shape-following property, less overflow of an adhesive, the interlayer adhesion between the multilayer films, and the slipping property of the film simultaneously (see Patent Documents 11 to 16).

Patent Document 11: JP 2000-263724 A
Patent Document 12: JP 2000-272055 A
Patent Document 13: JP 2003-001772 A
Patent Document 14: JP 2003-246019 A
Patent Document 15: JP 2003-276139 A
Patent Document 16: JP 2001-310422 A As above, in the conventional technologies, there has been no multilayer mold releasing films for printed circuit board production that comprises as the outermost layer, a resin layer substantially containing PPE as a main component. Also, they have not been satisfactory in slipping property, i.e., workability, or less sticking to printed circuit board products.

DISCLOSURE OF THE INVENTION

The present invention provides a mold releasing film suitable for production of printed circuit boards, particularly flexible printed circuit boards, which is excellent in mold-releasing property, exhibits little heat shrinkage, hardly imparts wrinkles to printed circuit board products, itself hardly gets wrinkled, and is excellent in contamination resistance since no bleeding-out is observed, and also which is excellent in an anti-moisture absorbing property, shape-following property, less overflow of adhesive, adhesion between multilayer films, and slipping property between films.

As a result of extensive studies on technologies to achieve the above object, the present inventors have found that a film comprising a resin composition containing a polyphenylene ether-based resin as a main component is excellent in mold-releasing property, heat shrinkage, anti-wrinkle property, contamination resistance, anti-moisture absorbing property, thermal resistance, rigidity and workability, and thus a mold releasing film which is excellent in shape-following property, less overflow of adhesive, adhesion between multilayer films and slipping property between films and which is suitable for production of flexible printed circuit boards is obtained. Thus, the present invention has been completed.

Namely, the above object of the invention has been achieved by providing the mold releasing films for printed circuit board production of the following 1 to 16.

1. A mold releasing film for printed circuit board production, which comprises a resin layer (P) containing (A) a polyphenylene ether-based resin in an amount of 50 wt % or more.

2. The mold releasing film for printed circuit board production according to the above 1, wherein the resin layer (P) further contains (B) a liquid crystalline polyester in an amount of 0.5 to 50 parts by weight per 100 parts by weight of components (A) and (B).

3. The mold releasing film for printed circuit board production according to the above 2, wherein the resin layer (P) further contains (C) a compound containing monovalent, divalent, trivalent or tetravalent metal element, in an amount of 0.1 to 10 parts by weight per 100 parts by weight of the total weight of components (A) and (B).

4. The mold releasing film for printed circuit board production according to the above 3, wherein the monovalent, divalent, trivalent or tetravalent metal element comprises at least one of a Zn element and Mg element.

5. The mold releasing film for printed circuit board production according to the above 2, wherein the resin layer (P) further contains (D) a silane compound in an amount of 0.1 to 5 parts by weight per 100 parts by weight of the total weight of components (A) and (B).

6. The mold releasing film for printed circuit board production according to the above 5, wherein the silane compound (D) has an amino group.

7. The mold releasing film for printed circuit board production according to the above 6, wherein the resin layer (P) further contains (E) a hydrocarbon-based wax in an amount of 0.1 to 4 parts by weight per 100 parts by weight of the total weight of components (A) and (B).

8. The mold releasing film for printed circuit board production according to the above 1, which has a monolayer structure consisting essentially of the resin layer (P).

9. The mold releasing film for printed circuit board production according to the above 1, which has a multilayer structure comprising the resin layer (P) and a layer (Q) containing (F) an elastomer.

10. The mold releasing film for printed circuit board production according to the above 9, wherein the elastomer (F) is (G) a partially hydrogenated polymer of a block copolymer of an aromatic vinyl compound and a conjugated diene compound.

11. The mold releasing film for printed circuit board production according to the above 10, wherein the content of a bonded aromatic vinyl compound in component (G) is from 5 wt % to 65 wt %.

12. The mold releasing film for printed circuit board production according to the above 9, wherein the elastomer (F) is (H) a copolymer of ethylene and a vinyl ester compound.

13. The mold releasing film for printed circuit board production according to any one of the above 1 to 12, obtained by molding through an extrusion tubular method.

14. The mold releasing film for printed circuit board production according to any one of the above 1 to 12, obtained by molding through a T-die extrusion method.

15. The mold releasing film for printed circuit board production according to any one of the above 1 to 12, having a contact angle between the film surface of its outermost surface layer and a water drop of 80° or more.

16. The mold releasing film for printed circuit board production according to any one of the above 1 to 12, wherein the printed circuit board is a flexible printed circuit board.

BEST MODE FOR CARRYING OUT THE INVENTION

The present invention is described in detail below.

The polyphenylene ether-based resin (A) of the invention comprises a repeating unit of formula 1:

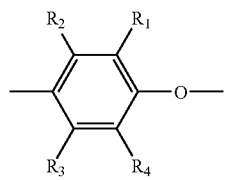
(1)

wherein $R_1$ and $R_4$ each independently represent hydrogen, primary or secondary lower alkyl, phenyl, aminoalkyl, or hydrocarbonoxy; $R_2$ and $R_3$ each independently represent hydrogen, primary or secondary lower alkyl, or phenyl. The resin is a homopolymer and/or copolymer having a reduced viscosity (0.5 g/dl, chloroform solution, measured at 30° C.) of 0.15 to 1.0 dl/g. The reduced viscosity is more preferably in the range of 0.20 to 0.70 dl/g, most preferably in the range of 0.40 to 0.60 dl/g.

Specific examples of the polyphenylene ether-based resin include, for example, poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether), and further include polyphenylene ether copolymers such as copolymers of 2,6-dimethylphenol with the other phenols, e.g., 2,3,6-trimethylphenol and 2-methyl-6-butylphenol. Of these, preferred are poly(2,6-dimethyl-1,4-phenylene ether) and a copolymer of 2,6-dimethylphenol with 2,3,6-trimethylphenol, and more preferred is poly(2,6-dimethyl-1,4-phenylene ether).

As an example of the process for producing the polyphenylene ether (A) for use in the invention, a method of oxidative polymerization of 2,6-xylenol using a complex of cuprous salt with an amine as described in U.S. Pat. No. 3,306,874 can be cited.

The methods described in U.S. Pat. Nos. 3,306,875, 3,257,357 and 3,257,358, JP 52-017880 B, JP 50-051197 A and JP 63-152628 A are also preferred as the methods for producing the polyphenylene ether (A).

The polyphenylene ether-based resin (A) of the invention may be used in the form of a powder after the polymerization step or in the form of pellets obtained by melt-kneading under a nitrogen atmosphere or a non-nitrogen atmosphere or under degassed or non-degassed conditions using an extruder.

The polyphenylene ether-based resin (A) of the invention also includes polyphenylene ethers functionalized with various dienophile compounds. Examples of the dienophile compounds include, for example, maleic anhydride, maleic acid, fumaric acid, phenylmaleimide, itaconic acid, acrylic acid, methacrylic acid, methyl acrylate, methyl methacrylate, glycidyl acrylate, glycidyl methacrylate, stearyl acrylate, and styrene. Furthermore, as the method for functionalization with these dienophile compounds, the functionalization may be carried out in a molten state under degassed or non-degassed conditions in the presence or absence of a radical generator using an extruder. Alternatively, the functionalization may be carried out in a non-molten state, i.e., within the temperature range of room temperature to below the melting point in the presence or absence of a radical generator. At this time, the melting point of a polyphenylene ether is defined as the peak-top temperature of a peak observed in a temperature-thermal flow graph obtained by differential scanning calorimeter (DSC) measurement at a temperature elevation rate of 20° C./minute. When two or more of the peak-top temperatures are observed, the melting point is defined as the highest temperature thereof.

The polyphenylene ether-based resin (A) of the invention is a polyphenylene ether resin alone or a mixture of a polyphenylene ether resin and an aromatic vinyl polymer and also includes those further mixed with other resins. Examples of the aromatic vinyl polymer include, for example, atactic polystyrene, high-impact polystyrene, syndiotactic polystyrene, and acrylonitrile-styrene copolymers. In the case of using a mixture of a polyphenylene ether resin and an aromatic vinyl polymer, the content of the polyphenylene ether resin is 60 wt % or more, preferably 70 wt % or more, more preferably 80 wt % or more based on the total amount of the polyphenylene ether resin and an aromatic vinyl polymer.

The liquid crystalline polyester (B) of the invention is a polyester called a thermotropic liquid crystalline polymer. A known one can be used. Examples thereof include, for example, a thermotropic liquid crystalline polymer containing p-hydroxybenzoic acid and polyethylene terephthalate as main constitutional units, a thermotropic liquid crystalline polymer containing p-hydroxybenzoic acid and 2-hydroxy-6-naphthoic acid as main constitutional units, and a thermotropic liquid crystalline polymer containing p-hydroxybenzoic acid and 4,4'-dihydroxybiphenyl and terephthalic acid as main constitutional units, but the liquid crystalline polymer is not particularly limited. As the liquid crystalline polyester (B) for use in the invention, a polyester comprising the following structural units (i), (ii), and if necessary, (iii) and/or (iv) is preferably used.

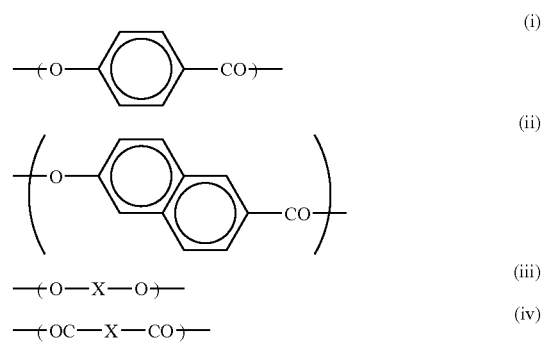

The structural units (i) and (ii) are a polyester structural unit formed from p-hydroxybenzoic acid and a structural unit formed from 2-hydroxy-6-naphthoic acid, respectively. Use of the structural units (i) and (ii) can afford a thermoplastic resin composition of the invention excellent in the balance of mechanical properties such as thermal resistance, flowability and rigidity. The X in the above structural units (iii) and (iv) may be any one or two or more selected from the following formula 2.

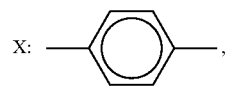

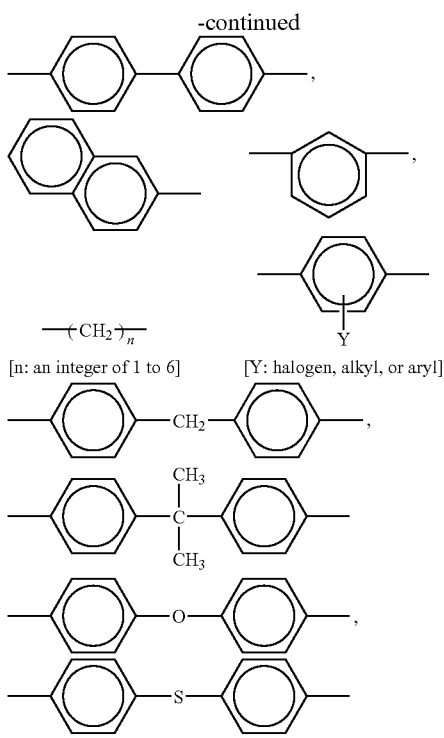

[n: an integer of 1 to 6] [Y: halogen, alkyl, or aryl]

In the structural formula (iii), preferred are structural units formed from ethylene glycol, hydroquinone, 4,4'-dihydroxybiphenyl, 2,6-dihydroxynaphthalene, and bisphenol A, respectively, more preferred are from ethylene glycol, 4,4'-dihydroxybiphenyl, and hydroquinone, and particularly preferred are from ethylene glycol and 4,4'-dihydroxybiphenyl. In the structural formula (Iv), preferred are structural units formed from terephthalic acid, isophthalic acid, and 2,6-dicarboxynaphthalene, respectively, and more preferred are from terephthalic acid and isophthalic acid.

As the structural formula (iii) or (iv), the above structural units may be used at least singly or in combination of two or more thereof. In the case that two or more of them are used in combination, specific examples of the structural formula (iii) include, for example, 1) the structural unit formed from ethylene glycol/the structural unit formed from hydroquinone, 2) the structural unit formed from ethylene glycol/the structural unit formed from 4,4'-dihydroxybiphenyl, and 3) the structural unit formed from hydroquinone/the structural unit formed from 4,4'-dihydroxybiphenyl.

Moreover, examples of the structural formula (Iv) include, for example, 1) the structural unit formed from terephthalic acid/the structural unit formed from isophthalic acid, and 2) the structural unit formed from terephthalic acid/the structural unit formed from 2,6-dicarboxynaphthalene. The amount of terephthalic acid is preferably 40 wt % or more, more preferably 60 wt % or more, particularly preferably 80 wt % or more based on the two components. The use of the amount of terephthalic acid of 40 wt % or more results in a resin composition exhibiting relatively good flowability and heat resistance. The ratio of the structural units (i), (ii), (iii) and (iv) in the liquid crystalline polyester (B) component is not particularly limited. However, the amounts of the structural units (iii) and (iv) are, in principle, almost equimolar.

Furthermore, a structural unit (v) composed of the structural units (iii) and (iv) may be used as a structural unit in component (B). Specific examples thereof include, for example, 1) the structural unit formed from ethylene glycol and terephthalic acid, 2) the structural unit formed from hydroquinone and terephthalic acid, 3) the structural unit formed from 4,4'-dihydroxybiphenyl and terephthalic acid, 4) the structural unit formed from 4,4'-dihydroxybiphenyl and isophthalic acid, and 5) the structural unit formed from bisphenol A and terephthalic acid.

$$-(O-X-OCO-X-CO)-\quad\text{(iv)}$$

Into the liquid crystalline polyester component (B) of the invention, a structural unit formed from other aromatic dicarboxylic acids, aromatic diols, and/or aromatic hydroxycarboxylic acids, can be introduced as needed in the range of such a small amount that does not impair the characteristics and advantages of the invention. The temperature at which component (B) starts to exhibit a liquid crystalline state upon melting (hereinafter referred to as liquid crystal-starting temperature) is preferably from 150 to 350° C., more preferably from 180 to 320° C. To control the liquid crystal-starting temperature within this range is preferable since the amount of black foreign substances is reduced in the resulting resin sheet.

The compound (C) containing monovalent, divalent, trivalent or tetravalent metal element is an inorganic compound or an organic compound. Component (C) of the invention is a compound essentially containing a metal element as a main constitutional component. Specific examples of the metal element capable of being monovalent, divalent, trivalent or tetravalent in component (C) include Li, Na, K, Zn, Cd, Sn, Cu, Ni, Pd, Co, Fe, Ru, Mn, Pb, Mg, Ca, Sr, Ba, Al, Ti, Ge, and Sb. Of these, preferred are elements of Zn, Mg, Ti, Pb, Cd, Sn, Sb, Ni, Al and Ge, and further preferred are elements of Zn, Mg and Ti. From the viewpoints of no peeling of components (A) and (B) in the resin layer (P) and a great improvement in the toughness of the film, it is particularly preferred that the monovalent, divalent, trivalent, or tetravalent metal element is Zn element and/or Mg element.

As specific examples of the compound (C) containing monovalent, divalent, trivalent or tetravalent metal element, oxides, hydroxides, alkoxide salts, aliphatic carboxylate salts and acetate salts of the above-mentioned metal elements are desirable. Furthermore, examples of preferable oxides include, for example, ZnO, MgO, $TiO_4$, $TiO_2$, PbO, CdO, SnO, SbO, $Sb_2O_3$, NiO, $Al_2O_3$, and GeO. In addition, examples of preferable hydroxides include, for example, $Zn(OH)_2$, $Mg(OH)_2$, $Ti(OH)_4$, $Ti(OH)_2$, $Pb(OH)_2$, $Cd(OH)_2$, $Sn(OH)_2$, $Sb(OH)_2$, $Sb(OH)_3$, $Ni(OH)_2$, $Al(OH)_3$, and $Ge(OH)_2$. Moreover, examples of preferable alkoxide salts include, for example, $Ti(O^iPr)_4$ and $Ti(O''Bu)_4$. Furthermore, examples of preferable aliphatic carboxylate salts include, for example, zinc stearate, magnesium stearate, titanium stearate, lead stearate, cadmium stearate, tin stearate, antimony stearate, nickel stearate, aluminum stearate, and germanium stearate. Of these, particularly preferable specific examples include ZnO, $Mg(OH)_2$, $Ti(O^iPr)_4$, $Ti(O''Bu)_4$, zinc acetate, zinc stearate, and aluminum stearate. Furthermore, from the viewpoint of no layer peeling between components (A) and (B), ZnO and $Mg(OH)_2$ are preferred. Moreover, these components (C) may contain impurities within the range where the advantages of the invention are not impaired.

The silane compound (D) of the invention means a silane compound having a functional group, which is a silane compound having at least one functional group selected from the group consisting of an amino group, a ureido group, an epoxy group, an isocyanate group, and a mercapto group. The silane compound having a functional group may be usually a silane compound having at least one of these functional groups and optionally, it may be a silane compound having two or more of these functional groups. Moreover, the silane compound for use in the invention is usually an alkoxysilane having the above functional group in the molecule. Specific examples of the silane compound having a functional group include, for example, silane compounds containing an amino group, such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, and γ-phenyl-γ-aminopropyltrimethoxysilane; silane compounds having a ureido group, such as γ-ureidopropyltrimethoxysilane, γ-ureidopropylmethyltrimethoxysilane, γ-ureidopropyltriethoxysilane, γ-ureidopropylmethyltriethoxysilane, and γ-(2-ureidoethyl)aminopropyltrimethoxysilane; silane compounds having an epoxy group, such as γ-glycidoxypropyltrimethoxysilane, γ-glycidoxypropyldimethylmethoxysilane, γ-glycidoxypropyltriethoxysilane, γ-glycidoxypropylmethyldiethoxysilane, β-(3,4-epoxycyclohexyl)ethyltrimethoxysilane, and β-(3,4-epoxycyclohexyl)ethyltriethoxysilane; silane compounds having an isocyanate group, such as γ-isocyanatopropyltrimethoxysilane, γ-isocyanatopropylmethyldimethoxysilane, γ-isocyanatopropyltriethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; and silane compounds having a mercapto group, such as γ-mercaptopropylmethyldimethoxysilane, γ-mercaptopropyltriethoxysilane, γ-mercaptopropylethyldiethoxysilane, γ-mercaptopropylmethyldiethoxysilane, γ-mercaptoethyltrimethoxysilane, β-mercaptoethyltriethoxysilane, and β-mercaptoethyldimethoxysilane. Furthermore, from the viewpoint of the toughness of the film and from the viewpoint of no layer peeling between components (A) and (B), the silane compounds having an amino group are preferred. Namely, γ-aminopropyltrimethoxysilane, γ-aminopropyltriethoxysilane, γ-aminopropylmethyldimethoxysilane, N-(β-aminoethyl)-γ-aminopropyltrimethoxysilane, and N-(β-aminoethyl)-γ-aminopropylmethyldimethoxysilane are preferred.

The hydrocarbon-based wax (E) substantially comprises carbon and hydrogen and is substantially a saturated oligomer or polymer or a mixture thereof. They may be optionally oxidized or have a carboxyl group, a hydroxyl group, or a carbonyl group. The hydrocarbon-based wax (E) may be roughly classified into a liquid paraffin and a polyethylene wax. A liquid paraffin is a mixture of mainly paraffin hydrocarbons and alkyl naphthene hydrocarbons, which is liquid at ordinary temperature. It is also sometimes called mineral oil. The liquid paraffins include those having a specific gravity at 15° C. of 0.8494 or less and also those having a specific gravity at 15° C. of more than 0.8494. For example, Crystol N352 (registered trademark) or Primol N542 (registered trademark) manufactured by Exxon Mobil Inc. can be suitably used. The polyethylene wax is a wax having a viscosity-average molecular weight of 900 to 30,000, which is solid at ordinary temperature. The following four types may be used. Namely, there are mentioned 1) a wax obtained by polymerizing a monomer comprising ethylene as a main component under a high temperature and a high pressure in the presence of a radical polymerization catalyst or by polymerizing the same under a low pressure with a Ziegler catalyst; 2) a wax obtained by converting polyethylene for general molding into a low-molecular weight one by thermal decomposition; 3) a wax obtained by separation and purification of low-molecular-weight polyethylene produced as a by-product in the production of polyethylene for general molding; and 4) a wax obtained by oxidizing polyethylene for general molding (sometimes referred to as emulsion wax). Of these, a wax having a density of 0.92 to 0.98 (g/cm$^3$) is suitable. Moreover, in view of the mold releasing property, a wax having a viscosity-average molecular weight of 900 to 10,000 is preferred, and a wax having a viscosity-average molecular weight of 1,000 to 4,000 is further preferred. In addition, an oxidized type wax can be also used in view of affinity to the resin composition of the invention. In that case, in view of the mold releasing property, an acid value (KOH mg/g) obtained by the measurement in accordance with JIS K5902 is preferably 20 or less, more preferably 5 or less. For example, as a representative one, Mitsui Hi-wax (registered trademark) manufactured by Mitsui Chemicals Inc. is suitably used.

The resin composition of the film in the invention contains a polyphenylene ether-based resin in an amount of 50 wt % or more. From the viewpoints of the heat resistance, mold releasing property, thermal shrinkage rate, and anti-moisture absorbing property, the content is preferably 60 wt % or more, more preferably 70 wt % or more, particularly preferably 80 wt % or more.

The mixing amount of the liquid crystalline polyester of component (B) in the invention is from 0.5 to 50 parts by weight, preferably 1 to 40 parts by weight, more preferably 2 to 30 parts by weight per 100 parts by weight of the total of components (A) and (B). From the viewpoints of anisotropy of the liquid crystalline polymer and unevenness of film thickness, the upper limit of the mixing amount is preferably 50 parts by weight. From the viewpoints of the mold releasing property and flowability, the lower limit of the mixing amount is preferably 0.5 parts by weight. From the viewpoints of the mold releasing property with a polyimide film as a base film of a flexible printed circuit board and rigidity (workability on film handling), the liquid crystalline polyester (B) is preferably mixed in an amount of the above range.

From the viewpoints of the layer peeling between components (A) and (B), specific gravity, and heat resistance, the mixing amount of component (C) in the invention is from 0.1 to 10 parts by weight, preferably 0.2 to 5 parts by weight, more preferably 0.4 to 3 parts by weight per 100 parts by weight of the total of components (A) and (B). When the content of component (C) is less than 0.1 part by weight, the layer peeling of the film itself becomes remarkable and when the content is more than 10 parts by weight, sometimes, the specific gravity increases and heat resistance decreases.

The mixing amount of component (D) in the invention is preferably from 0.1 to 5 parts by weight, more preferably 0.15 to 3 parts by weight, particularly preferably 0.2 to 1 parts by weight per 100 parts by weight of total of components (A) and (B), from the viewpoints of the layer peeling between components (A) and (B) and stable production. When the content of component (D) is less than 0.1 part by weight, the layer peeling of the film itself becomes remarkable and when the content is more than 5 parts by weight, sometimes, undesirable side reactions such as decomposition and crosslinking may occur and hence the composition of the invention is not reliably obtained.

From the viewpoints of the mold releasing property and bleeding-out, the mixing amount of the hydrocarbon-based wax (E) in the invention is preferably from 0.1 to 4 parts by weight, more preferably 0.3 to 3 parts by weight, particularly preferably 0.5 to 2 parts by weight per 100 parts by weight of the total of components (A) and (B). When the content of component (E) is less than 0.1 part by weight, a sufficient mold releasing property with an adhesive is sometimes not obtained and when the content is more than 4 parts by weight, sometimes, component (E) bleeds out after hot pressing to thereby be transferred to printed circuit boards.

In the invention, in addition to the above components, it is possible to add other additional components within the range where the advantages of the invention are not impaired. Examples thereof include, for example, an antioxidant; a flame retardant; an elastomer, e.g., an olefin copolymer such as an ethylene/propylene copolymer, an ethylene/1-butene copolymer, an ethylene/propylene/non-conjugated diene copolymer, an ethylene/ethyl acrylate copolymer, an ethylene/glycidyl methacrylate copolymer, an ethylene/vinyl acetate/glycidyl methacrylate copolymer, an ethylene/propylene-g-maleic anhydride copolymer, or ABS, a polyester polyether elastomer, a polyester polyester elastomer, an aromatic vinyl compound-conjugated diene compound block copolymer, or a hydrogenation product of the aromatic vinyl compound-conjugated diene compound block copolymer; a plasticizer such as epoxidized soybean oil, polyethylene glycol, or an aliphatic ester; a flame retardant aid; a weather (light) resistance improver, and various colorants.

The mold releasing film for printed circuit board production of the invention is a film comprising the thermoplastic resin layer (P) containing the above resin composition. Thus, the mold releasing film for printed circuit board production of the invention is used for protecting printed circuit boards and preventing contamination of a hot pressing machine or cushion materials with an adhesive at the time when a copper-clad laminate or a copper foil is thermally pressed through a prepreg or heat-resistant film in the production step of printed circuit boards, flexible printed circuit boards, multilayer printed circuit boards, and the like.

The mold releasing film for printed circuit board production having a multilayer structure, which is a second invention according to the present invention, is described below. The mold releasing film for printed circuit board production having a multilayer structure comprising the resin layer (P) of the invention and a layer (Q) containing an elastomer (F) has a structure wherein the resin layer (P) described above is an outermost layer and the layer (Q) containing an elastomer (F) is inserted as an intermediary layer. In principle, the structure is a three layer structure of (P)/(Q)/(P). Optionally, it is also possible to form a five layer structure by inserting further adhesive layers between layers (P) and (Q). However, from the viewpoints of film thickness and simplification, the three layer structure is preferred.

The elastomer of component (F) of the invention includes, for example, an olefinic copolymer such as an aromatic vinyl compound-conjugated diene compound block copolymer, (G) a partially hydrogenated polymer of the aromatic vinyl compound-conjugated diene compound block copolymer, (H) an ethylene-vinyl ester copolymer, an ethylene/propylene copolymer, an ethylene/1-butene copolymer, an ethylene/propylene/non-conjugated diene copolymer, an ethylene/propylene-g-maleic anhydride copolymer, or ABS; a polyester polyether elastomer; and a polyester polyester elastomer. In the ethylene-vinyl ester copolymer (H), the vinyl ester compound means a vinyl monomer having an ester group or a carboxyl group. Examples thereof include, for example, vinyl acetate, vinyl propionate, methyl acrylate, ethyl acrylate, methyl methacrylate, ethyl methacrylate, acrylic acid, and methacrylic acid. Particularly, in component (F), from the viewpoints of the shape-following property and adhesion between the multilayer films, the partially hydrogenated polymer (G) of a block copolymer of an aromatic vinyl compound and a conjugated diene compound and the ethylene-vinyl ester copolymer (H) are preferred. The partially hydrogenated polymer (G) of a block copolymer of an aromatic vinyl compound and a conjugated diene compound is described below. First, the block copolymer of an aromatic vinyl compound and a conjugated diene compound means a block copolymer comprising a polymer block segment mainly comprising an aromatic compound and a polymer block segment mainly comprising a conjugated diene compound. As specific examples of the aromatic vinyl compound, one or more compounds may be selected from the group consisting of styrene, α-methylstyrene, vinyltoluene, p-tert-butylstyrene, divinylbenzene, p-methylstyrene, and 1,1-diphenylstyrene. Of these, styrene is preferred. As specific examples of the conjugated diene compound, one or more compounds may be selected from the group consisting of butadiene, isoprene, 1,3-pentadiene, 2,3-dimethyl-1,3-butadiene, piperylene, 3-butyl-1,3-octadiene, and phenyl-1,3-butadiene. Of these, butadiene, isoprene, and a combination thereof are preferred. The polymer of component (G) is preferably partially hydrogenated in view of heat resistance and thermal deterioration resistance. Furthermore, the hydrogenation rate is preferably from 5 to 100%. The structural characteristics relating to the partially hydrogenated block copolymer may be used singly or in combination of two or more as far as they satisfy the requirements detailed in JP 61-034049 A. Representative examples thereof include TUFTEC (registered trademark) manufactured by Asahi Kasei Chemicals Corporation, KRATON (registered trademark) manufactured by Kraton Polymer Japan, and DYNARON manufactured by JSR Co., Ltd., SEPTON (registered trademark) and HYBRAR (registered trademark) manufactured by Kuraray Co., Ltd.

Particularly, as characteristics of a mold releasing film, in view of the heat resistance, shape-following property and adhesion between layers (P) and (Q), the content of bonded aromatic vinyl compound in component (G) is preferably from 5 wt % to 65 wt %, more preferably from 10 wt % to 60 wt %, particularly preferably from 30 wt % to 50 wt %. When the content is less than 5 wt %, sufficient heat resistance is hardly exhibited and hence, in the hot pressing for printed circuit board production, layer (Q) may overflow from layer (P) and attach to a pressing machine and a cushion material. When it exceeds 65 wt %, a sufficient shape-following property and a sufficient adhesion between layers (P) and (Q) are hardly exhibited.

The resin layer (P) containing the polyphenylene ether-based resin (A) in an amount of 50% by weight or more is excellent in workability owing to its high rigidity as a monolayer film, but a film having a multilayer structure is more preferable for the application of printed circuit board production, which requires the shape-following property, less overflow of adhesive, adhesion between multilayer films, and the slipping property between films.

The thickness of the mold releasing film of the invention is from 3 to 100 μm in the case of use as a monolayer film. From the viewpoint of handling, it is more preferably from 10 to 100 μm, particularly preferably from 30 to 60 μm. In the case of use as a multilayer film, the total thickness is from 50 to 300 μm, and from the viewpoints of the shape-following property and workability, it is preferably from 70 to 250 μm, more preferably from 100 to 200 μm. In the case of a multilayer structure, the ratio of the thickness of the intermediate layer (Q) is preferably 50% or more, more preferably 60% or more, further preferably 70% or more based on the total thickness. When the ratio is less than 50%, a sufficient shape-following property cannot be exhibited.

The resin composition of the invention can be produced by various methods. Examples include, for example, thermal melt-kneading methods by means of a single-screw extruder, twin-screw extruder, a roller, a kneader, a Brabender plastograph, and a Banbury mixer. Of these, a melt-kneading method using a twin-screw extruder is most preferable. The melt-kneading temperature at the time is not particularly limited and may be usually selected from the range of 150 to 350° C.

The mold releasing film for printed circuit board production according to the invention can be obtained by extrusion film molding using the resin composition obtained as described above as a starting material or by charging starting components constituting the resin composition of the invention directly to an extrusion film molding machine and carrying out the blending and film molding simultaneously.

The mold releasing film for printed circuit board production according to the invention can be produced by an extrusion tubular method, or optionally by a method called inflation molding. For forming a sheet having an even sheet thickness without layer peeling of individual components of the resin composition, it is very important to regulate the temperature of a parison, which is suitably selected from the temperature range of 50 to 290° C., so that the parison coming out of a cylinder is not immediately cooled. A film having a multilayer structure can be obtained by multilayer lamination of a layer (P)-providing resin with a layer (Q)-providing resin component.

On the other hand, the mold releasing film for printed circuit board production according to the invention can be also produced by T-die extrusion molding. In this case, the film may be used without orientation or may be obtained with uniaxial orientation or biaxial orientation. In the case that increased strength and rigidity of the sheet is desired, orientation is effective. As the method of the multilayer lamination of the layer (P)-providing resin with the layer (Q)-providing resin component, methods of dry lamination and co-extrusion lamination can be cited. In the case of dry lamination, a monolayer film of layer (P) is once produced, the elastomer (F) which is the layer (Q)-providing resin is extruded from a T-die while feeding the monolayer from the upper and lower parts in the vicinity of the T-die, and then the resulting sheet is rolled to effect lamination. The method is particularly effective when the viscosity of layer (P) is largely different from that of layer (Q). On the other hand, in the case of co-extrusion lamination, the lamination of the layer (P)-providing resin component and the layer (Q)-providing resin component can be effected using a multilayer die with an extruder. A multilayer film can be produced in one step and hence the method is economical.

With regard to the mold releasing film for printed circuit board production according to the invention, the contact angle between the film surface of an outermost surface layer and a water drop is preferably 80° or more. From the viewpoints of the mold releasing property and moisture-absorbing property, the angle is 80° or more, preferably 85° or more, more preferably 90° or more. When the value is less than 80°, the mold releasing property is sometimes not sufficiently exhibited and also the anti-moisture absorbing property is sometimes not satisfactory. The measurement of the contact angle between the film surface and a water drop can be carried out in an atmosphere of ordinary temperature (23° C.) using, for example, a solid-liquid interface-analyzing apparatus, prop Master (registered trademark) manufactured by Kyowa Interface Science Co., Ltd.

The printed circuit boards in the mold releasing film for printed circuit board production according to the invention include rigid type printed circuit boards represented by epoxy resins and flexible printed circuit boards represented by polyimides. Recently, for the flexible printed circuit boards, in particular, required specifications on outgas and contamination in portable phones and hard disk drives (HDD) have become considerably severe and the mold releasing film of the invention is more suitable for the flexible printed circuit boards also from the viewpoint of contamination resistance.

Since the thus obtained mold releasing film for printed circuit board production according to the invention is a mold releasing film suitable for production of printed circuit boards, particularly flexible printed circuit boards, which is excellent in a mold-releasing property, exhibits little heat shrinkage, hardly imparts wrinkles to printed circuit board products, itself hardly gets wrinkled, and is excellent in contamination resistance since no bleeding-out is observed, and also which is excellent in an anti-moisture absorbing property, shape-following property, less overflow of adhesive, adhesion between multilayer films, and slipping property between films.

EXAMPLES

The present invention will be illustrated with reference to the following Examples, but the invention is not limited thereto.

Production Example 1

Production of Polyphenylene Ether (PPE-1)

The polyphenylene ether is poly(2,6-dimethyl-1,4-phenylene ether) in a powder form having a reduced viscosity of 0.42, obtained by oxidative polymerization of 2,6-dimethylphenol.

Production Example 2

Production of Liquid Crystalline polyester (LCP-1)

A liquid crystalline polyester (LCP-1) having the theoretical structural formula shown below was obtained by charging p-hydroxybenzoic acid, 2-hydroxy-6-naphthoic acid and acetic anhydride under a nitrogen atmosphere and heating and melting the whole to effect polycondenzation. The component ratio of the composition is given by molar ratio.

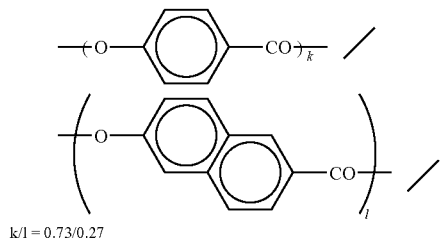

$k/l = 0.73/0.27$

Production Example 3

Production of Liquid Crystalline Polyester (LCP-2)

A liquid crystalline polyester having the theoretical structural formula shown below was obtained by charging p-hydroxybenzoic acid, 2-hydroxy-6-naphthoic acid, hydroquinone, isophthalic acid and acetic anhydride under a nitrogen atmosphere and heating and melting the whole to effect polycondenzation. The component ratio of the composition is given by molar ratio.

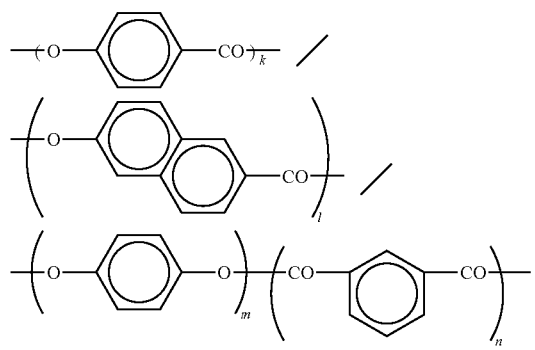

k/l/m/n = 0.7/0.2/0.1/0.1

The film formation and physical property evaluation of each resin composition were carried out in accordance with the following methods.

(1) Inflation Molding

Extrusion sheet molding was carried out with the obtained pellets by a tubular method using an extruder having a screw diameter of 50 mm set at a cylinder temperature of 290° C. and a cylindrical die temperature of 290° C. The pressure of blowing air was set so that the thickness became 50 μm.

In the case of a multilayer film, the film was prepared while regulating the pressure of blowing air and fusion-bonding using a pinch roller so as to form a three-layer structure wherein layer (P), layer (Q) and layer (P) were 30 μm, 150 μm and 30 μm in thickness, respectively.

(2) T-Die Extrusion Molding

Extrusion Sheet Molding was Carried Out with the obtained pellets using a single-screw extruder with a vent having a screw diameter of 65 mm set at a cylinder temperature of 300° C. and a T-die temperature of 300° C. while regulating a take-over speed so as to attain a discharging amount of 60 kg/hr, a T-die slit thickness of 0.15 mm, a die slit width of 650 mm, a rolling roller surface temperature of 130° C. and a thickness of 50 μm.

In the case of obtaining a multilayer film, extrusion sheet molding was carried out using a three-layer type extruder with a three-layer T-die of feed block-type while regulating the take-over speed so as to attain a total discharging amount of 60 kg/hr, a die slit width of 650 mm, a rolling roller surface temperature of 130° C., and so as to form a three-layer structure wherein layer (P), layer (Q), and layer (P) were 30 μm, 150 μm and 30 μm in thickness, respectively.

(3) Film Thickness

A film was cut into a size having a width of 500 mm and a length of 200 mm. Thickness was measured at 10 points in total, 5 points each in the width direction of the upper side and the lower side thereof. Furthermore, the same measurement was made for an additional sheet. Thus, the thickness was measured at 20 points in total and the average value thereof was calculated.

(4) Contact Angle

Using a solid-liquid interface analyzing apparatus, prop Master 500 (registered trademark) manufactured by Kyowa Interface Science Co., Ltd., each of the films obtained in the above (1) and (2) was fixed on a stage and one drop (2 μl) of distilled water was dropped on the film. The contact angle was measured at 10 points and the average value thereof was calculated. The measurement was carried out in the atmosphere at ordinary temperature (23° C.)

(5) Mold Releasing Property

A polyimide film (Kapton 100H (registered trademark) manufactured by Du Pont) having a thickness of 25 μm was used as a base film and a copper foil having a thickness of 35 μm and a width of 50 μm was adhered thereto through an epoxy adhesive having a thickness of 20 μm to obtain a copper-clad laminate (i). Next, an epoxy adhesive was applied in a thickness of 20 μm on a polyimide film (Kapton 100H (registered trademark) manufactured by Du Pont) having a thickness of 25 μm to obtain a cover-lay film (ii). A monolayer film having a thickness of 50 μm obtained in the above (1) or (2) was used as a mold releasing film (iii). So that the epoxy adhesive layer of (ii) came into contact with the copper foil side of (i), the films were laminated in the order of (iii), (i), (ii) and (iii) and hot pressing was carried out at 190° C. and 50 kgf/cm$^2$ for 1 minute to obtain a flexible printed circuit board. After the hot pressing, the mold releasing property was judged in accordance with the following judging criteria at the time when the mold releasing film (iii) was peeled from the polyimide films (i, ii).

Mold-releasing property with the board surface was referred to as "vs FPC" and mold-releasing property with an adhesive and copper foil exposed at a land portion (a hole for an electrode) of the (i) and (ii) parts as "vs adhesive/copper foil".

A: the film is peeled with no resistance.
B: the film is slightly resistant at the peeling.
C: the film is adhered and not easily peeled off.

After the peeling (peeled by force in the case of C), presence or absence of breakage of the mold releasing film was confirmed.

(6) Thermal Shrinkage

The mold releasing film obtained in the above (1) and (2) were cut into pieces having a size of 150 mm×150 mm, so that each side was parallel to MD or TD. The pieces were set in an oven set at 190° C. for 5 minutes and then taken out and cooled. The length of each of MD and TD before and after the heating was measured and thermal shrinkage was determined according to the following equation.

Thermal shrinkage (%)=(length of side before heating−length of side after heating)/(length of side before heating)×100

Therein, MD means the direction of flowing a resin from a die of an inflation extrusion machine or a T-die extrusion machine and TD means the perpendicular direction to MD.

(7) Wrinkle of FPC (Flexible Printed Circuit Board)

Except that a polyimide film (Kapton 50H (registered trademark) manufactured by Du Pont) having a thickness of 12.5 μm×150×250 mm was used, a pressing test was carried out in the same manner as in the above (3). The obtained FPC was taken out and the presence or absence of wrinkles of FPC was confirmed.

(8) Bleeding-Out 1

A polyimide film (Kapton 500H (registered trademark) manufactured by Du Pont) having a thickness of 125 μm was sandwiched with the mold releasing films obtained in the above (1) or (2) and was hot-pressed under conditions of 190° C., 30 kgf/cm$^2$ and 5 minutes. Then, after the mold releasing films were removed, a line was written with an aqueous felt pen (width of pen tip: about 1.5 mm) on the surface of the polyimide film which had been brought into contact with the mold releasing films. After standing for 5 minutes, the extent of repellency of the aqueous felt pen ink was visually observed and the bleeding-out property was judged according to the following judging criteria.

A: a state where the felt pen ink is not repelled
C: a state where the felt pen ink is repelled (9) Bleeding-Out 2

A polyimide film (Kapton 500H (registered trademark) manufactured by Du Pont) having a thickness of 125 μm was bar-coated with an epoxy adhesive having a thickness of 20 μm and the adhesive was cured at 50° C. for 2 hours to prepare an adhesive-coated polyimide film. The mold releasing film obtained in the above (1) or (2) was placed on the adhesive-coated surface of the film and was hot-pressed under conditions of 190° C., 30 kgf/cm² and 5 minutes. Thereafter, the mold releasing film was peeled off and the contact angle at the adhesive-coated surface side of the polyimide was measured in accordance with the above method of (4). On the other hand, when the above adhesive-coated polyimide film was cured at 190° C. for 5 hours with no pressurization and then cooled and the contact angle on the surface was measured as a blank, the angle was found to be 58° C. Accordingly, by comparing the contact angle with the contact angle of the blank (58° C.), it was judged that some bleeding-out occurred at the polyimide side since the difference was larger.

(10) Anti-Moisture Absorbing Property

The mold releasing film obtained in the above (1) or (2) was cut into pieces having a size of 100 mm×190 mm square. After the pieces were exposed under heating and moisturizing conditions of 85° C. and 95% relative humidity for 48 hours using a constant temperature-constant humidity chamber (manufactured by Tabai Espec Corp., PL-3FP), the weight increase rate (Aw) was determined according to the following equation. An average value of each two films was determined.

Weight increase rate (Δw) (%)=(w₁−w₀)/w₀×100 wherein $w_1$: film weight (g) after heating and moisturization, $w_0$: film weight (g) after being dried at 100° C. for 2 hours in a hot air dryer and cooled to room temperature in a desiccator before heating and moisturization.

A smaller value of the weight increase rate (Aw) means that the film is excellent in anti-moisture absorbing property.

(11) Heat Resistance

The obtained pellets were molded using an injection molding machine (IS-80EPN: manufactured by Toshiba Machine Co., Ltd.) set at cylinder temperatures of 320/330/320/310° C., an injection rate of 85%, and a mold temperature of 90° C. However, in Comparative Examples 1 and 2, the molding was carried out with all the cylinder temperatures being set at of 280° C. Thus, the pellets were molded into ASTM strip specimens having a size of thickness 3.2 mm×length 127 mm×width 12.7 mm. Using the obtained specimens, the deflection temperature under a load of 1.82 MPa was measured in accordance with ASTM D648.

(12) Rigidity

Using the same specimens as in the above (11), flexural modulus and flexural strength were measured under a temperature atmosphere of 23° C. in accordance with ASTM D790 using an autograph (AG-500, manufactured by Shimadzu Corporation).

Example 1

The polyphenylene ether (PPE-1), the liquid crystalline polyester (LCP-1), and zinc oxide (ZnO, Ginrei-A, manufactured by Toho Zinc Co., Ltd.) were melt-kneaded in a ratio (part(s) by weight) shown in Table 1 to obtain pellets, using a twin-screw extruder (ZSK-25; manufactured by WERNER & PFLEIDERER) with a vent port set at only one barrel temperature at the top-feed side of 250° C. and all other barrel temperatures and a die-head temperature of 310° C. Using the pellets, a film having an average thickness of 51 μm was obtained by the T-die extrusion molding shown in the above (2). According to the above methods, the film was evaluated. The results are shown in Table 1. The deflection temperature under load was 184° C. and the flexural modulus was 2,670 MPa.

Example 2

Except that polystyrene (GP, manufactured by PS Japan Corporation, G9305) was used as the component (A) and individual components were mixed in the ratios (part(s) by weight) shown in Table 1, pellets were obtained in the same manner as in Example 1. A film having an average thickness of 50 μm was obtained by the T-die extrusion molding shown in the above (2). According to the above methods, the film was evaluated. The results are shown in Table 1. The deflection temperature under load was 167° C. and the flexural modulus was 2,740 MPa.

Example 3

Except that LCP-2 was used as the component (B), a liquid paraffin (Wax 1, manufactured by Exxon Mobil Inc., Crystol N352, a colorless liquid at ordinary temperature) was used as the component (E), and individual components were mixed in the ratios (part(s) by weight) shown in Table 1, pellets were obtained in the same manner as in Example 2. A film having an average thickness of 49 μm was obtained by the T-die extrusion molding shown in the above (2). According to the above methods, the film was evaluated. The results are shown in Table 1. The deflection temperature under load was 168° C. and the flexural modulus was 2,750 MPa.

Example 4

Except that high-impact polystyrene (HIPS, manufactured by PS Japan Corporation, H9405) was used as the component (A), a polyethylene wax (Wax 2, manufactured by Mitsui Chemicals Inc., Mitsui Hi-wax (registered trademark), 405 MP, a white solid at ordinary temperature), and individual components were mixed in the ratios (part(s) by weight) shown in Table 1, pellets were obtained in the same manner as in Example 3. A film having an average thickness of 50 μm was obtained by the T-die extrusion molding shown in the above (2). According to the above methods, the film was evaluated. The results are shown in Table 1. The deflection temperature under load was 163° C. and the flexural modulus was 2,820 MPa.

Example 5

Except that magnesium hydroxide ($Mg(OH)_2$, analytical grade, manufactured by Wako Pure Chemical Industries, Ltd.) was used as the component (C) instead of zinc oxide and the components were mixed in the ratios (part(s) by weight) shown in Table 1, pellets were obtained in the same manner as in Example 3. A film having an average thickness of 52 μm was obtained by the T-die extrusion molding shown in the above (2). According to the above methods, the film was evaluated. The results are shown in Table 1. The deflection temperature under load was 158° C. and the flexural modulus was 2,600 MPa.

Example 6

Except that a partially hydrogenated polymer of block copolymer of an aromatic vinyl compound and a conjugated diene compound (SEBS1, manufactured by Asahi Kasei Chemicals Corporation, TUFTEC H1272 (registered trademark)) or (SEBS2, manufactured by Asahi Kasei Chemicals Corporation, TUFTEC H1041 (registered trademark)) was used as another component in addition to the components (A) to (E), and the components were mixed in the ratios (part(s) by weight) shown in Table 1, pellets were obtained in the same manner as in Example 5. A film having an average thickness of 60 μm was obtained by the inflation molding shown in the above (1). According to the above methods, the film was evaluated. The results are shown in Table 1. The deflection temperature under load was 150° C. and the flexural modulus was 2,300 MPa.

Example 7

Except that a silane compound having an amino group (silane 1, N-(β-aminoethyl)-γ-aminopropylmethyldimethoxysilane, KBM-602, manufactured by Shin-Etsu Chemical Co., Ltd.) was used as the component (D) instead of the component (C) and the components were mixed in the ratios (part(s) by weight) shown in Table 1, pellets were obtained in the same manner as in Example 6. A film having an average thickness of 40 μm was obtained by the inflation molding shown in the above (1). According to the above methods, the film was evaluated. The results are shown in Table 1. The deflection temperature under load was 176° C. and the flexural modulus was 2,740 MPa.

Example 8

Using a highly heat-resistant modified PPE resin (modified PPE, manufactured by Asahi Kasei Chemicals Corporation, XYRON X9102 (registered trademark)), an alloy of polyphenylene ether with a polystyrene-based resin, as a resin composition containing PPE, a film having an average thickness of 40 μm was obtained by the inflation molding shown in the above (1). According to the above methods, the film was evaluated. The results are shown in Table 1. The deflection temperature under load was 159° C. and the flexural modulus was 2,360 MPa.

Example 9

Except that the component (A) and the other components were mixed in ratios (part(s) by weight) shown in Table 1, pellets were obtained in the same manner as in Example 1. A film having an average thickness of 50 μm was obtained by the inflation molding shown in the above (1). According to the above methods, the film was evaluated. The results are shown in Table 1. The deflection temperature under load was 143° C. and the flexural modulus was 2,100 MPa.

Comparative Example 1

Except that a poly(4-methyl-1-pentene) resin (PMP, RT18, TPX (registered trademark), manufactured by Mitsui Chemicals Inc.) was used as pellets, a film having an average thickness of 51 μm was obtained by the inflation molding shown in the above (1). According to the above methods, the film was evaluated. The results are shown in Table 1. The deflection temperature under load was 100° C. and the flexural modulus was 1,280 MPa.

Comparative Example 2

Except that a polyethylene terephthalate resin (PET, NEH2050, manufactured by Unitika Ltd.) was used as pellets, a film having an average thickness of 50 μm was obtained by the T-die extrusion molding shown in the above (2). According to the above methods, the film was evaluated. The results are shown in Table 1. The deflection temperature under load was 75° C. and the flexural modulus was 2,420 MPa.

Comparative Example 3

Except that the components (A) to (C) were mixed in the ratios (part(s) by weight) shown in Table 1, pellets were obtained in the same manner as in Example 1. A film having an average thickness of 50 μm was obtained by the T-die extrusion molding shown in the above (2). According to the above methods, the film was evaluated. The results are shown in Table 1. The deflection temperature under load was 172° C. and the flexural modulus was 5,100 MPa.

Example 10

Except that the components (A), (B), (C) and (E) were mixed in the ratios (part(s) by weight) shown in Table 1, pellets were obtained in the same manner as in Example 1. A film having an average thickness of 52 μm was obtained by the T-die extrusion molding shown in the above (2). According to the above methods, the film was evaluated. The results are shown in Table 1. The deflection temperature under load was 151° C. and the flexural modulus was 2,400 MPa.

TABLE 1

| Composition | | | Ex. 1 | Ex. 2 | Ex. 3 | Ex. 4 | Ex. 5 | Ex. 6 | Ex. 7 |
|---|---|---|---|---|---|---|---|---|---|
| | (A) | PPE-1 | 95 | 83 | 86 | 81 | 70 | 65 | 95 |
| | | GP | | 13 | 9 | 7 | 14 | 20 | |
| | | HIPS | | | | 6 | 10 | | |
| | (B) | LCP-1 | 5 | 4 | | | 6 | 15 | 5 |
| | | LCP-2 | | | 5 | 6 | | | |
| | (C) | ZnO | 0.8 | 0.8 | 0.8 | 0.8 | | | |
| | | Mg(OH)$_2$ | | | | | 0.8 | 0.8 | |
| | (D) | Silane 1 | | | | | | | 0.2 |
| | (E) | Wax 1 | | | | 0.5 | | 2 | 0.2 |
| | | Wax 2 | | | | | 1 | | |
| | Others | SEBS 1 | | | | | | 4 | |
| | | SEBS 2 | | | | | | 2 | |
| | | Modified PPE X9102 | | | | | | | |
| | | PMP | | | | | | | |
| | | PET | | | | | | | |

TABLE 1-continued

|  |  |  |  |  |  |  |  |  |  |
|---|---|---|---|---|---|---|---|---|---|
| Evaluation | Film thickness (μm) | | 51 | 50 | 49 | 50 | 52 | 60 | 40 |
| | Contact angle (°) | | 84 | 86 | 90 | 91 | 101 | 87 | 85 |
| | Mold releasing property | vs FPC | A | A | A | A | A | A | A |
| | | vs Adhesive/Copper foil | A | A | A | A | A | A | A |
| | Breakage of film | | None | None | None | None | None | None | None |
| | Thermal shrinkage (%) | MD | 0.27 | 0.22 | 0.23 | 0.27 | 0.19 | 0.03 | 0.01 |
| | | TD | 0.25 | 0.24 | 0.21 | 0.22 | 0.17 | 0.05 | 0.08 |
| | Wrinkles of FPC | | None | None | None | None | None | None | None |
| | Bleeding-out 1 | | A | A | A | A | A | A | A |
| | Bleeding-out 2 (°) | | 59 | — | 61 | 63 | 61 | — | — |
| | Anti-moisture absorbing property Δw (%) | | 0.024 | 0.018 | 0.019 | 0.024 | 0.021 | 0.046 | 0.032 |

|  |  |  | Ex. 8 | Ex. 9 | Comp. Ex. 1 | Comp. Ex. 2 | Comp. Ex. 3 | Ex. 10 |
|---|---|---|---|---|---|---|---|---|
| Composition | (A) | PPE-1 | | 60 | | | 25 | 81 |
| | | GP | | 20 | | | 20 | 7 |
| | | HIPS | | 20 | | | | 6 |
| | (B) | LCP-1 | | | | | 55 | 6 |
| | | LCP-2 | | | | | | |
| | (C) | ZnO | | | | | 0.8 | 0.8 |
| | | Mg(OH)$_2$ | | | | | | |
| | (D) | Silane 1 | | | | | | |
| | (E) | Wax 1 | | | | | | 5 |
| | | Wax 2 | | | | | | |
| | Others | SEBS 1 | | | | | | |
| | | SEBS 2 | | | | | | |
| | | Modified PPE X9102 | 100 | | | | | |
| | | PMP | | | 100 | | | |
| | | PET | | | | 100 | | |
| Evaluation | Film thickness (μm) | | 40 | 50 | 51 | 50 | 50 | 52 |
| | Contact angle (°) | | 90 | 89 | 107 | 77 | 76 | 101 |
| | Mold releasing property | vs FPC | A | A | A | B | A | A |
| | | vs Adhesive/Copper foil | A | A | A | C | C | A |
| | Breakage of film | | None | None | None | Present | Present | None |
| | Thermal shrinkage (%) | MD | 0.12 | 0.05 | −0.95 | 1.58 | 0.15 | 0.29 |
| | | TD | 0.38 | 0.06 | 0.38 | −0.13 | 0.21 | 0.26 |
| | Wrinkles of FPC | | None | None | Present | Present | None | None |
| | Bleeding-out 1 | | A | A | C | A | A | C |
| | Bleeding-out 2 (°) | | — | — | 99 | — | — | — |
| | Anti-moisture absorbing property Δw (%) | | 0.043 | 0.016 | 0.019 | 0.56 | 0.041 | 0.021 |

From the above results, films comprising a resin layer (P) containing a polyphenylene ether resin in an amount of 50% by weight or more according to the invention are suitable as a mold releasing film for the production of flexible printed circuit boards, which has an excellent mold-releasing property, exhibits little heat shrinkage, hardly imparts wrinkles to printed circuit board products, and itself hardly gets wrinkled and which is also excellent in contamination resistance since no bleeding-out is observed, and is also excellent in anti-moisture absorbing property.

A mold releasing film for printed circuit board production having a multilayer structure, which is a second invention, will be illustrated below.

(13) Following Property

The film was placed on a brass plate with a groove having a depth of 30 μm and was pressurized under conditions of 180° C., 30 kg/cm$^2$, and 3 minutes using a hot press. Inroads into the groove were visually observed and the shape-following property was judged in accordance with the following judging criteria.

A: very good transferring property of the groove.

C: bad transferring property of the groove or wrinkle formation in the vicinity of the groove.

(14) Overflow of Adhesive

For the evaluation of the mold releasing property in the above (5), an overflowed amount of the adhesive toward a land (a hole for an electrode) after pressing was observed on an optical microscope. The overflow property of the adhesive was evaluated based on the following criteria.

A: the case that the overflowed amount of the adhesive is 0.08 mm or less.

B: the case that the overflowed amount of the adhesive exceeds 0.08 mm and is 0.15 mm or less.

C: the case that the overflowed amount of the adhesive exceeds 0.15 mm.

(15) Adhesion Between P-Q Layers

A: the films of the P layer and the Q layer are not peeled off.

C: the P layer and the Q layer are easily peeled off or not at all adhered with each other.

(16) Slipping Property

Two multilayer films were laminated and pressed under conditions of room temperature, 5 kg/cm$^2$, and 15 seconds using a pressing machine. Thereafter, only the upper layer film was slid and the slipping property with the lower layer film was judged according to the following judging criteria. The test was repeated three times.

A: It is possible to slide only the upper layer film three times without attachment to the lower layer film.

C: It is impossible to slide only the upper layer film at least once, with attachment to the lower layer film.

Production Example 4

Production of Resin Layer (P) (P-i)

The pellets obtained in Example 1 were used as is.

Production Example 5

Production of Resin Layer (P) (P-ii)

The pellets obtained in Example 2 were used as is.

Production Example 6

Production of Resin Layer (P) (P-iii, P-iv, P-v)

Except that the components were mixed in the ratios shown in Table 2, pellets were obtained in the same manner as in Example 1.

Production Example 7

Production of Resin Layer (P) (P-vi)

As the highly heat-resistant modified PPE resin used in Example 8, XYRON X9102 (registered trademark) manufactured by Asahi Kasei Chemicals Corporation was used.

TABLE 2

| | | | P-i | P-ii | P-iii | P-iv | P-v | P-iv |
|---|---|---|---|---|---|---|---|---|
| Composition | (A) | PPE-1 | 95 | 83 | 95 | 83 | 65 | |
| | | GP | | 13 | | 13 | 20 | |
| | (B) | LCP-1 | 5 | 4 | 5 | 4 | 15 | |
| | (C) | ZnO | 0.8 | 0.8 | | 0.8 | 0.8 | |
| | (D) | Silane 1 | | | 0.2 | | | |
| | (E) | Wax 1 | | | | 1 | | |
| | | Wax 2 | | | | | 2 | |
| | | modified PPE X9102 | | | | | | 100 |

Production Example 8

Production of Resin Layer (P) (P-vii)

Two parts by weight of maleic anhydride (analytical grade, manufactured by Wako Pure Chemicals), 80 parts of PPE-1, 15 parts of a high impact polystyrene (H9405, manufactured by PS Japan Corporation), and 5 parts of polystyrene were mixed and treated in the same manner as in Production Example 4 to obtain a polyphenylene ether-based resin composition functionalized with maleic acid.

Production Example 9

Production of Partially Hydrogenated Polymer of Block Copolymer of Aromatic Vinyl Compound and Conjugated Diene Compound (SEBS-i)

A partially hydrogenated polymer of a block copolymer, having a polystyrene-hydrogenated polybutadiene-polystyrene structure and having a bonded styrene amount of 35%, a number-average molecular weight of 62,000, a molecular weight distribution of 1.05, a 1,2-vinyl bonding amount of polybutadiene before hydrogenation of 38%, and a hydrogenation rate in the polybutadiene portions of 99.9%, was synthesized.

Production Example 10

Production of Partially Hydrogenated Polymer of Block Copolymer of Aromatic Vinyl Compound and Conjugated Diene Compound (SEBS-ii)

A partially hydrogenated polymer of a block copolymer, having a polystyrene-hydrogenated polybutadiene-polystyrene structure and having a bonded styrene amount of 60%, a number-average molecular weight of 89,000, a molecular weight distribution of 1.08, a 1,2-vinyl bonding amount of polybutadiene before hydrogenation of 38%, and a hydrogenation rate in the polybutadiene portions of 99.8%, was synthesized.

Production Example 11

Production of Partially Hydrogenated Polymer of Block Copolymer of Aromatic Vinyl Compound and Conjugated Diene Compound (SEBS-iii)

By the method described in JP 63-099257 A, using 1,3-dimethyl-2-imidazolidinone, a block copolymer having a polystyrene-hydrogenated polybutadiene-polystyrene structure and having a bonded styrene amount of 8%, a number-average molecular weight of 51,000, a molecular weight distribution of 1.04, and a 1,2-vinyl bonding amount of polybutadiene of 38% was obtained. By further hydrogenation, a partially hydrogenated polymer having a hydrogenation rate in the polybutadiene portions of 99.8% was synthesized.

Production Example 12

Production of Partially Hydrogenated Polymer of Block Copolymer of Aromatic Vinyl Compound and Conjugated Diene Compound (SEBS-iv)

A partially hydrogenated polymer of a block copolymer, having a polystyrene-hydrogenated polybutadiene-polystyrene structure and having a bonded styrene amount of 3%, a number-average molecular weight of 52,000, a molecular weight distribution of 1.05, a 1,2-vinyl bonding amount of polybutadiene before hydrogenation of 38%, and a hydrogenation rate in the polybutadiene portions of 99.9%, was synthesized.

Production Example 13

Production of Partially Hydrogenated Polymer of Block Copolymer of Aromatic Vinyl Compound and Conjugated Diene Compound (SEBS-v)

A partially hydrogenated polymer of block copolymer, having a polystyrene-hydrogenated polybutadiene-polystyrene structure and having a bonded styrene amount of 70%, a number-average molecular weight of 82,000, a molecular weight distribution of 1.05, a 1,2-vinyl bonding amount of polybutadiene before hydrogenation of 38%, and a hydrogenation rate in the polybutadiene portions of 99.9%, was synthesized.

Example 11

Using P-i as layer (P) and using the partially hydrogenated polymer of the block copolymer of the aromatic vinyl compound and the conjugated diene compound (SEBS-i) as layer (Q), a multilayer film was obtained by the T-die extrusion molding shown in the above (2). Using this film as a mold releasing film, the film was evaluated according to the above methods. The results are shown in Table 3.

Example 12

Except that P-ii was used as layer (P) instead of P-i, a multilayer film was obtained in the same manner as in Example 11. According to the above methods, the film was evaluated. The results are shown in Table 3.

Example 13

Except that P-iii was used as layer (P) instead of P-i and a multilayer film was obtained by the inflation molding shown in the above (1), the film was evaluated in the same manner as in Example 11. The results are shown in Table 3.

Example 14

Except that P-iv was used as layer (P) instead of P-i, a multilayer film was obtained in the same manner as in Example 11. According to the above methods, the film was evaluated. The results are shown in Table 3.

Example 15

Except that P-v was used as layer (P) instead of P-i, a multilayer film was obtained in the same manner as in Example 11. According to the above methods, the film was evaluated. The results are shown in Table 3.

Example 16

Except that SEBS-ii was used instead of SEBS-i as layer (Q), i.e., the partially hydrogenated polymer of the block copolymer of an aromatic vinyl compound and a conjugated diene compound, a multilayer film was obtained in the same manner as in Example 11. According to the above methods, the film was evaluated. The results are shown in Table 3.

Example 17

Except that P-vi was used as layer (P) instead of P-i and SEBS-ii was used as layer (Q) instead of SEBS-i, i.e., the partially hydrogenated polymer of the block copolymer of an aromatic vinyl compound and a conjugated diene compound, a multilayer film was obtained in the same manner as in Example 11. According to the above methods, the film was evaluated. The results are shown in Table 3.

Example 18

Except that P-vii was used as layer (P) instead of P-i and SEBS-iii was used as layer (Q) instead of SEBS-i, i.e., the partially hydrogenated polymer of the block copolymer of an aromatic vinyl compound and a conjugated diene compound, a multilayer film was obtained in the same manner as in Example 11. According to the above methods, the film was evaluated. The results are shown in Table 3.

Example 19

Using an ethylene-vinyl acetate copolymer (EVA-1, manufactured by Asahi Kasei Chemicals Corporation, SUNTEC EF0925 (registered trademark), VA content of 9 wt %, MFR=2.5 g/10 min) as layer (Q) instead of SEBS-i, monolayer films of P-i obtained by the T-die method in the above (2) were individually fed from an upper part and a lower part of a T-die, the EVA-1 resin was charged through the T-die in a molten state, and the whole was dry-laminated on the first roll set at 165° C. to obtain a multilayer film. The thickness of the P/Q/P layer was 30/150/30 μm.

Example 20

Except that P-iv was used as layer (P) instead of P-i, a multilayer film was obtained by the dry-lamination method in the same manner as in Example 19. The thickness of the P/Q/P layer was 25/150/25 μm.

Example 21

Except that SEBS-iv was used as layer (Q) instead of SEBS-i, the operations were conducted in the same manner as in Example 11. The adhesion between the p-Q layers was ranked as C. The layers were easily peeled off.

Example 22

Except that SEBS-v was used as layer (Q) instead of SEBS-i, the operations were conducted in the same manner as in Example 11. The shape-following property was ranked as C. The overflow property of the adhesive was ranked as B.

Comparative Example 4

Except that a poly(4-methyl-1-pentene) resin (PMP, RT18, TPX (registered trademark), manufactured by Mitsui Chemicals Inc.) was used as layer (P) and the inflation molding shown in (1) was carried out, a multilayer film was obtained in the same manner as in Example 11. Using this film as a mold releasing film, the film was evaluated according to the above methods. The results are shown in Table 3.

Since the P-Q layers were not suitably adhered, it was impossible to evaluate the shape-following property and slipping property.

Comparative Example 5

Except that a polyethylene terephthalate resin (PET, NEH2050, manufactured by Unitika Ltd.) was used as layer (P), a multilayer film was obtained in the same manner as in Example 11. Using this film as a mold releasing film, the film was evaluated according to the above methods. The results are shown in Table 3. Since the P-Q layers were not suitably adhered, it was impossible to evaluate the shape-following property and slipping property.

Comparative Example 6

A poly(4-methyl-1-pentene) resin (PMP, RT18, TPX (registered trademark), manufactured by Mitsui Chemicals Inc.) was used as layer (P). Using it as a monolayer mold releasing film with no (Q) layer, the film was evaluated according to the above methods. The results are shown in Table 3.

TABLE 3

| | | Ex. 11 | Ex. 12 | Ex. 13 | Ex. 14 | Ex. 15 | Ex. 16 | Ex. 17 |
|---|---|---|---|---|---|---|---|---|
| Film | P layer | P-i | P-ii | P-iii | P-iv | P-v | P-i | P-vi |
| | Q layer | SEBS-i | SEBS-i | SEBS-i | SEBS-i | SEBS-i | SEBS-ii | SEBS-ii |
| | Layer construction | P/Q/P | P/Q/P | P/Q/P | P/Q/P | P/Q/P | P/Q/P | P/Q/P |
| | Molding method | T-die | T-die | Inflation | T-die | T-die | T-die | T-die |
| Contact angle on outermost surface layer | | 85 | 86 | 85 | 89 | 94 | 85 | 82 |
| Evaluation | Mold releasing property vs FPC | A | A | A | A | A | A | A |
| | vs adhesive/copper foil | A | A | A | A | A | A | A |
| | Following property | A | A | A | A | A | A | A |
| | Overflow of adhesive | A | A | A | A | A | A | A |
| | Adhesion between P-Q layers | A | A | A | A | A | A | A |
| | Slipping property | A | A | A | A | A | A | A |

| | | Ex. 18 | Ex. 19 | Ex. 20 | Comp. Ex. 4 | Comp. Ex. 5 | Comp. Ex 6 |
|---|---|---|---|---|---|---|---|
| Film | P layer | P-vii | P-i | P-iv | PMP | PET | PMP |
| | Q layer | SEBS-iii | EVA-i | EVA-i | SEBS-i | SEBS-i | — |
| | Layer construction | P/Q/P | P/Q/P | P/Q/P | P/Q/P | P/Q/P | P |
| | Molding method | T-die | T-die | T-die | Inflation | T-die | T-die |
| Contact angle on outermost surface layer | | 91 | 85 | 89 | 107 | 76 | 107 |
| Evaluation | Mold releasing property vs FPC | A | A | A | A | B | A |
| | vs adhesive/copper foil | A | A | A | A | C | A |
| | Following property | A | A | A | — | — | C |
| | Overflow of adhesive | A | A | A | A | A | B |
| | Adhesion between P-Q layers | A | A | A | C | C | — |
| | Slipping property | A | A | A | — | — | C |

From the above results, a film having a multilayer structure comprising a layer (P) containing (A) a polyphenylene ether-based resin and a layer (Q) containing (F) an elastomer according to the invention has an excellent mold releasing property and is excellent in shape-following property, an overflow property of an adhesive, adhesion between multilayer films and slipping property between films, and hence the film is found to be suitable for production of printed circuit boards, particularly flexible printed circuit boards.

Industrial Applicability

According to the present invention, it becomes possible to provide a mold releasing film suitable for the production of printed circuit boards, particularly flexible printed circuit boards, which is excellent in mold-releasing property, exhibits little heat shrinkage, hardly imparts wrinkles to printed circuit board products, itself hardly gets wrinkled, and is excellent in contamination resistance since no bleeding-out is observed, and also which is excellent in an anti-moisture absorbing property, shape-following property, less overflow of an adhesive, adhesion between multilayer films, and slipping property between films.

While the present invention has been described in detail and with reference to specific examples thereof, it will be apparent to one skilled in the art that various changes and modifications can be made therein without departing from the spirit and scope thereof.

What is claimed is:

1. A mold releasing film for printed circuit board production, which comprises a resin layer (P) having a thickness of 10-100 μm, containing (A) a polyphenylene ether-based resin in an amount of 50 wt % or more,
    wherein the resin layer (P) further contains:
    (B) a liquid crystalline polyester in an amount of 0.5 to 50 parts by weight per 100 parts by weight of the total weight of components (A) and (B),
    (C) a compound containing a monovalent, divalent, trivalent or tetravalent metal in an amount of 0.1 to 10 parts by weight per 100 parts by weight of the total weight of components (A) and (B), the monovalent divalent, trivalent or tetravalent metal comprising at least one of divalent Zn and divalent Mg, and
    (E) a hydrocarbon-based wax in an amount of 0.1 to 4 parts by weight per 100 parts by weight of the total weight of components (A) and (B).

2. The mold releasing film for printed circuit board production according to claim 1, which has a monolayer structure consisting essentially of the resin layer (P).

3. The mold releasing film for printed circuit board production according to claim 1, having a contact angle between the film surface of its outermost surface layer and a water drop of 80° or more.

4. The mold releasing film for printed circuit board production according to claim 1, wherein the printed circuit board is a flexible printed circuit board.

* * * * *

UNITED STATES PATENT AND TRADEMARK OFFICE
CERTIFICATE OF CORRECTION

| | | |
|---|---|---|
| PATENT NO. | : 8,124,694 B2 | Page 1 of 1 |
| APPLICATION NO. | : 12/458837 | |
| DATED | : February 28, 2012 | |
| INVENTOR(S) | : Hiroshi Kamo et al. | |

It is certified that error appears in the above-identified patent and that said Letters Patent is hereby corrected as shown below:

Column 28, Line 46 (Approx.), In Claim 1, delete "monovalent" and insert -- monovalent, --, therefor.

Signed and Sealed this
Eighth Day of May, 2012

David J. Kappos
*Director of the United States Patent and Trademark Office*